(12) United States Patent
Sandhu

(10) Patent No.: US 7,460,494 B2
(45) Date of Patent: Dec. 2, 2008

(54) ADAPTIVE SIGNALING IN MULTIPLE ANTENNA SYSTEMS

(75) Inventor: Sumeet Sandhu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 10/689,151

(22) Filed: Oct. 20, 2003

(65) Prior Publication Data

US 2005/0041611 A1 Feb. 24, 2005

Related U.S. Application Data

(60) Provisional application No. 60/493,937, filed on Aug. 8, 2003.

(51) Int. Cl.
| | |
|---|---|
| H04L 12/16 | (2006.01) |
| H04L 12/28 | (2006.01) |
| H04L 12/56 | (2006.01) |
| H04Q 11/00 | (2006.01) |
| H03C 7/02 | (2006.01) |
| H04B 1/16 | (2006.01) |

(52) U.S. Cl. .................. 370/264; 370/390; 370/396; 370/476; 455/101; 455/343.2

(58) Field of Classification Search ................ 370/264, 370/342, 476, 396, 390; 455/562.1, 562, 455/343.4, 503, 101, 11.1, 343.2
See application file for complete search history.

(56) References Cited

U.S. PATENT DOCUMENTS

| | | | | |
|---|---|---|---|---|
| 5,487,063 | A * | 1/1996 | Kakuma et al. | 370/396 |
| 5,802,049 | A * | 9/1998 | Watanabe | 370/390 |
| 6,937,592 | B1 * | 8/2005 | Heath et al. | 370/342 |
| 7,184,743 | B2 * | 2/2007 | Walton et al. | 455/343.4 |
| 7,224,704 | B2 * | 5/2007 | Lu et al. | 370/476 |
| 7,295,827 | B2 * | 11/2007 | Liu et al. | 455/343.2 |
| 2003/0087673 | A1 * | 5/2003 | Walton et al. | 455/562 |
| 2003/0185241 | A1 * | 10/2003 | Lu et al. | 370/476 |
| 2004/0002364 | A1 * | 1/2004 | Trikkonen et al. | 455/562.1 |
| 2005/0233760 | A1 * | 10/2005 | Voltolina et al. | 455/503 |
| 2006/0183421 | A1 * | 8/2006 | Proctor et al. | 455/11.1 |
| 2007/0054632 | A1 * | 3/2007 | Lu et al. | 455/101 |

FOREIGN PATENT DOCUMENTS

WO WO 02/33848 4/2002

OTHER PUBLICATIONS

PCT Search Report dated Dec. 17, 2004.

* cited by examiner

*Primary Examiner*—Thjuan K Addy
(74) *Attorney, Agent, or Firm*—Schwabe, Williamson & Wyatt, P.C.

(57) ABSTRACT

Briefly, in accordance with one embodiment of the invention, a wireless communication system may adaptively switch between a multiple input, multiple output mode and a spatial division, multiple access mode based at least in part on channel conditions and traffic conditions.

23 Claims, 3 Drawing Sheets

ADAPTIVE SIGNALING IN MULTIPLE ANTENNA SYSTEMS

CROSS-REFERENCE TO RELATED APPLICATION

The present application claims the benefit of U.S. provisional application Ser. No. 60/493,937, filed Aug. 8, 2003, entitled "A HIGH-THROUGHPUT WIRELESS NETWORK ARCHITECTURE, APPARATUS AND ASSOCIATED METHODS".

BACKGROUND OF THE INVENTION

In a wireless communication network, multiple antennas may be utilized at a transceiver in two possible ways: using a point-to-point communication system or using a point-to-multipoint communication system. A point-to-point communication system may be utilized to communicate with a single receiver to obtain higher signal quality and to provide a higher spectral efficiency. A point-to-multipoint communication system may be utilized to communicate with multiple receivers to obtain a higher signal quality and data throughput for each receiver. In such a multiple antenna wireless communication network, a point-to-point communication system may be a multiple input, multiple output (MIMO) system, and a point-to-multipoint communication system may be a spatial division, multiple access (SDMA) system.

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
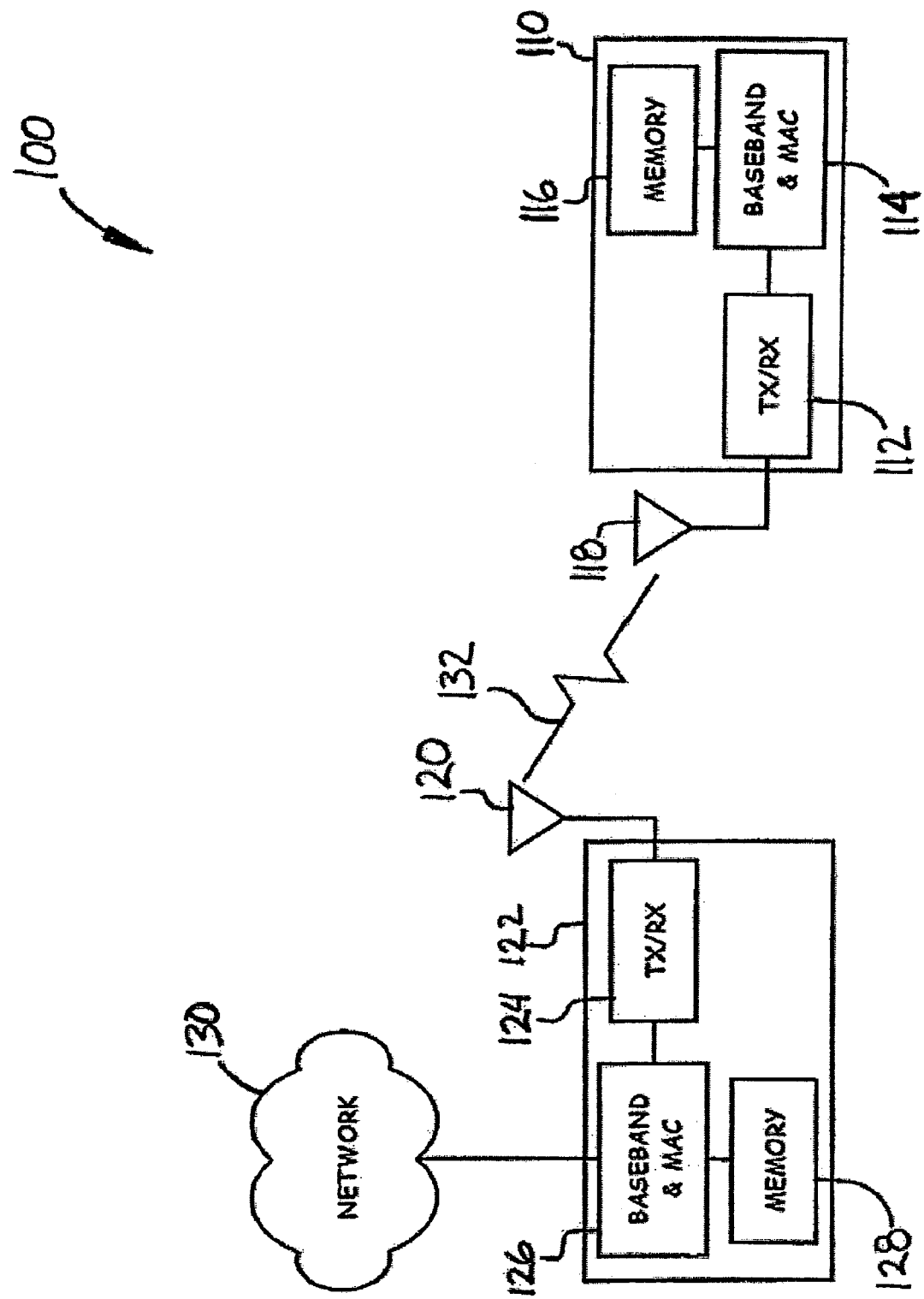
FIG. 1 is a diagram of a wireless local area network communication system in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art. In some embodiments, such algorithms and data processing may include analog processing at baseband frequencies, intermediate-frequencies (IF), or radio-frequencies (RF) implemented at least in part in hardware, in software, or in a combination thereof, although the scope of the invention is not limited in this respect.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), sensor networks, personal area networks (PANs) and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Referring now to FIG. 1, a wireless local area network communication system in accordance with one embodiment of the present invention will be discussed. In the WLAN communications system 100 shown in FIG. 1, a mobile unit 110 may include a wireless transceiver 112 to couple to an antenna 118 and to a processor 114 to provide baseband and media access control (MAC) processing functions. Processor 114 in one embodiment may comprise a single processor, or alternatively may comprise a baseband processor and an applications processor, although the scope of the invention is not limited in this respect. Processor 114 may couple to a memory 116 which may include volatile memory such as DRAM, non-volatile memory such as flash memory, or alternatively may include other types of storage such as a hard disk drive, although the scope of the invention is not limited in this respect. Some portion or all of memory 116 may be included on the same integrated circuit as processor 114, or alternatively some portion or all of memory 116 may be disposed on an integrated circuit or other medium, for example a hard disk drive, that is external to the integrated circuit of processor 114, although the scope of the invention is not limited in this respect.

Mobile unit 110 may communicate with access point 122 via wireless communication link 132, where access point 122 may include at least one antenna 120. In an alternative embodiment, access point 122 and optionally mobile unit 110 may include two or more antennas, for example to provide a spatial division multiple access (SDMA) system or a multiple input, multiple output (MIMO) system, although the scope of the invention is not limited in this respect. Access point 122 may couple with network 130 so that mobile unit 110 may communicate with network 130, including devices coupled to network 130, by communicating with access point 122 via wireless communication link 132. Network 130 may include a public network such as a telephone network or the Internet, or alternatively network 130 may include a private network such as an intranet, or a combination of a public and a private network, although the scope of the invention is not limited in this respect. Communication between mobile unit 110 and access point 122 may be implemented via a wireless local area network (WLAN), for example a network compliant with a an Institute of Electrical and Electronics Engineers (IEEE) standard such as IEEE 802.11a, IEEE 802.11b, IEEE 802.11g, IEEE 802.11n, HiperLAN-II, and so on, although the scope of the invention is not limited in this respect. In another embodiment, communication between mobile unit 110 and access point 122 may be at least partially implemented via a cellular communication network compliant with a 3GPP standard, although the scope of the invention is not limited in this respect.

Figure 2:
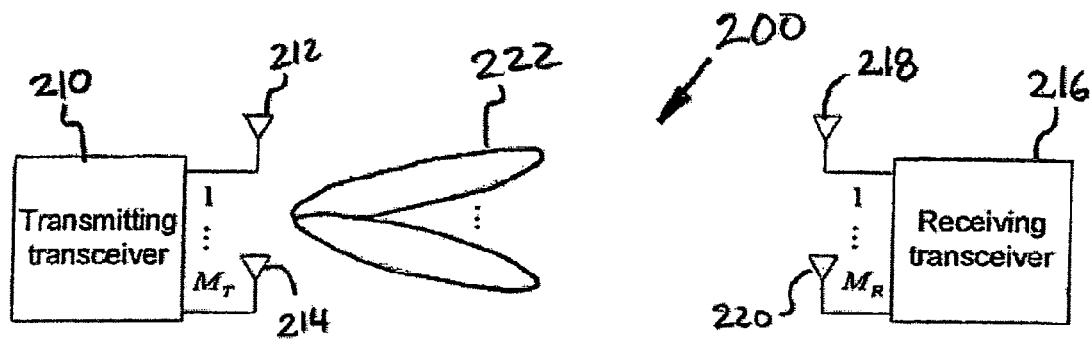
FIG. 2 is a diagram of a point-to-point system in accordance with one embodiment of the present invention.

Referring now to FIG. 2, a diagram of a multiple input, multiple output system in accordance with an embodiment of the present invention will be discussed. The multiple input, multiple output (MIMO) system 200 shown in FIG. 2 illustrates a MIMO link 222 between a transmitting transceiver 210 that may include a first antenna 212 up to $M_T$ 214 transmit antennas, and a receiving transceiver 216 that may include a first antenna 218 and up to $M_R$ 220 receive antennas. The MIMO system 200 of FIG. 2 may be analogous to the wireless local area network system 100 of FIG. 1 where transmitting transceiver 210 may correspond to access point 122 and receiving transceiver 216 may correspond to mobile unit 110, although the scope of the invention is not limited in this respect. The complex baseband channel at the $r^{th}$ receive antenna from the $t^{th}$ transmit antenna may be defined as the [r,t] entry in the $M_R \times M_T$ channel matrix H. The channel matrix H may be defined as:

$$H = \begin{bmatrix} h_{11} & \cdots & h_{1M_T} \\ & \ddots & \\ h_{M_R 1} & \cdots & h_{M_R M_T} \end{bmatrix}$$

In one embodiment of the invention, the MIMO channel may correspond to a single carrier system. For example, in a multicarrier orthogonal frequency division multiplexing (OFDM) system, the channel matrix may correspond to the MIMO channel on one frequency tone, and may be different from tone to tone, although the scope of the invention is not limited in this respect.

In general, the channel matrix may be a random variable that may depend on the location of transmitting transceiver 210 and receiving transceiver 216, the placement of antennas 212 to 214 and 218 to 220, the carrier frequency, and the scattering environment around transmitting transceiver 210 and receiving transceiver 216. The channel matrix may vary with time depending on the rate at which the environment is changing or the rate at which transmitting transceiver 210 and receiving transceiver 216 may be moving. In accordance with one embodiment of the present invention, the channel may be reliably estimated at receiving transceiver 216.

To obtain channel knowledge at the transmitting transceiver 210, such as in a time division duplex (TDD) systems, the channel matrix H may be determined based on the channel estimated on the reverse link from the receiving transceiver 216 to the transmitting transceiver 210. In a frequency division duplex (FDD) system, the channel from the transmitting transceiver 210 to the receiving transceiver 216 may be highly uncorrelated with the channel in the reverse direction, so active feedback of the channel from the receiving transceiver 216 to the transmitting transceiver 210 may be utilized. Even in a TDD system, if the channel changes during the time between receiving and transmitting, or if the calibration on the transmit and receive radio-frequency (RF) chains is not sufficiently accurate, active feedback of the channel from the receiving transceiver 216 to the transmitting transceiver 210 may be utilized as well.

In accordance with one embodiment of the present invention, one of two ways to signal over a MIMO link may be utilized, depending on the degree of channel knowledge available at the transmitting transceiver 210: open-loop signaling where the transmitting transceiver 210 has no knowledge of the channel; and closed loop signaling where the transmitting transceiver 210 may have partial or complete information about the channel matrix H, for example the value of H, or alternatively statistics of H such as the correlation E HH*.

In accordance with one embodiment of the invention, both open loop signaling and transmitter-trained signaling techniques may be used to improve signal quality, for example the signal-to-noise ratio (SNR), at the receiving transceiver 216 regardless of the actual channel realization. Either of these techniques may be utilized to increase spectral efficiency as measured in bits per second per hertz, and performance may be a function of the channel realization H. In accordance with one particular embodiment of the invention, depending on the physics of the propagation environment, H may be conditioned to support a higher spectral efficiency. The condition number of H, κ(H) may be defined using the singular value decomposition of H=UΣV* as $\kappa = \sigma_1/\sigma_M$, where $\sigma_1$ is the strongest singular value and $\sigma_M$ is the weakest singular value of H and M=minimum($M_T, M_R$).

$$H = \begin{bmatrix} h_{11} & \cdots & h_{1M_T} \\ & \ddots & \\ h_{M_R 1} & \cdots & h_{M_R M_T} \end{bmatrix} = U\Sigma V^*$$

$$\Sigma = \begin{bmatrix} \sigma_1 & & & \\ & \ddots & & \\ & & \sigma_M & \\ & & & 0 \end{bmatrix}$$

$$\kappa = \frac{\sigma_1}{\sigma_M}$$

Both the open-loop and transmitter-trained MIMO techniques may provide optimal performance when κ=1, that is when most or all the singular values are equal. In the event the singular values are unequal, then κ>1. The larger the value of κ, the more ill-conditioned the channel H may be, and the smaller the improvement in spectral efficiency provided by the $M_R \times M_T$ point-to-point MIMO link.

Figure 3:
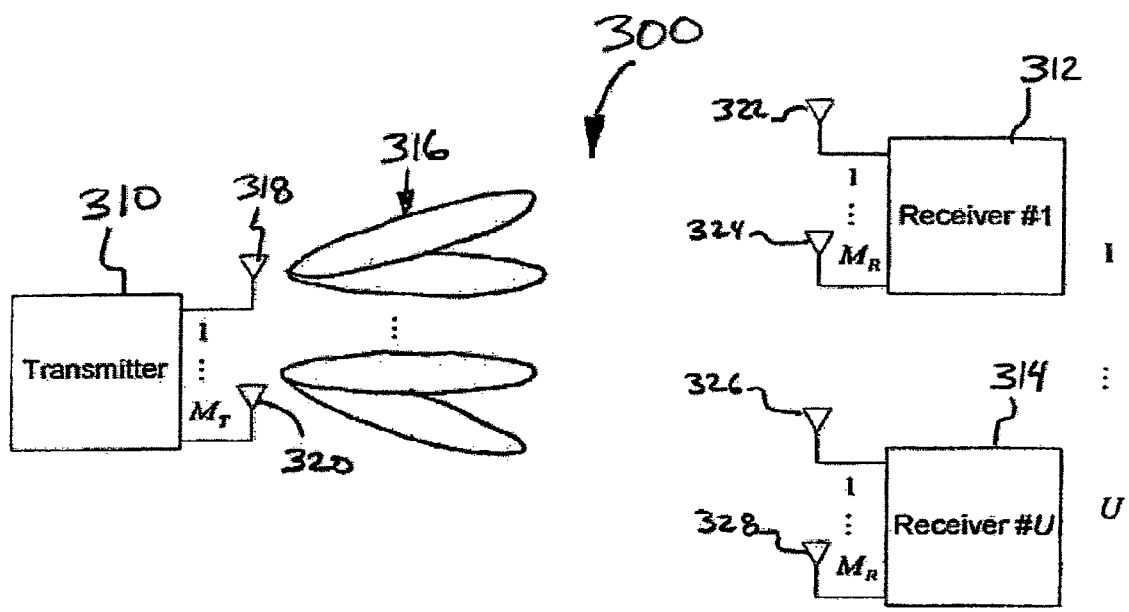
FIG. 3 is a diagram of a point-to-multipoint system in accordance with one embodiment of the present invention.

Referring now to FIG. 3, a spatial division multiple access system in accordance with an embodiment of the present invention will be discussed. As shown in FIG. 3, spatial division multiple access (SDMA) system 300 may include a transmitting transceiver 310, a first receiving transceiver 312, and up to a Uth receiving transceiver 314. In one embodiment of the invention, transmitter 310 may correspond to access point 122 of FIG. 1 and to transmitting transceiver 210 of FIG. 2. Likewise, receivers 312 to 314 may correspond to mobile unit 110 of FIG. 1 and to receiving transceiver 216 of FIG. 2, although the scope of the invention is not limited in this respect. In contrast to MIMO system 200, which in one embodiment may be a physical (PHY) layer technique, SDMA system 300 may be a media access control (MAC) layer technique that utilizes multiple antennas to simultaneously serve multiple users, such as U number of receivers. The SDMA system 300 may provide a point-to-multipoint SDMA link 316 between transmitting transceiver 310, which may have a first antenna 318 and up to $M_T$ 320 transmit antennas, and U receivers 312-314 having first antennas 322 and 326 up to $M_R$ 324 and 328 receive antennas, although the scope of the invention is not limited in this respect. The $M_R \times M_T$ complex baseband channel at the $U^{th}$ receiver may be labeled as $H_u$ which may be specified as follows:

$$H_U = \begin{bmatrix} h_{11} & \cdots & h_{1M_T} \\ & \ddots & \\ h_{M_R 1} & \cdots & h_{M_R M_T} \end{bmatrix}_{(U)}$$

Since different receiving transceivers 312 to 314 may be located at different physical locations, the channels of transceivers 312 to 314 are likely to be highly uncorrelated. As in MIMO system 200, these U channels may correspond to a single carrier system, and may be interpreted for example as the channels on a single tone of an OFDM system, although the scope of the invention is not limited in this respect. Furthermore, although the SDMA system 300 of FIG. 3 shows $M_R$ receive antennas on the transceivers 312 to 314, the number of receive antennas may vary from user 312 to user 314, although the scope of the invention is not limited in this respect. In such a case, $M_R$ may be interpreted as a maximum, or near maximum, number of receive antennas on the receivers 312 to 314, although the scope of the invention is not limited in this respect.

The multi-user channel at transmitter 310 may consist of a stacking of all the single-user channels as shown by:

H=[$H_1 \ldots H_U$]

For comparison to SDMA link 316, MIMO link 222 as shown in FIG. 2 may be interpreted in one case as a point-to-multipoint link where data may be concurrently encoded over multiple transmit antennas and concurrently decoded at multiple receive antennas, and may be considered as corresponding to virtual multiple SDMA users, and as a result may provide a higher spectral efficiency over the MIMO link, although the scope of the invention is not limited in this respect.

Taking into consideration the MAC layer traffic characteristics, a network with SDMA link 316 in one embodiment may outperform a network with independent MIMO links 222 in terms of aggregate throughput. Such a result may be especially appreciable in network hot-spots, where multiple MIMO users may encounter frequent collisions before they are able to access the carrier sense multiple access (CSMA) medium. As a result of such collisions, users may have to use random back off and wait before transmitting again, which may increase the latency per packet. In contrast, SDMA users may be served simultaneously without increasing the probability of collision, thereby resulting in higher network throughput and lower latency, although the scope of the invention is not limited in this respect.

Figure 4:
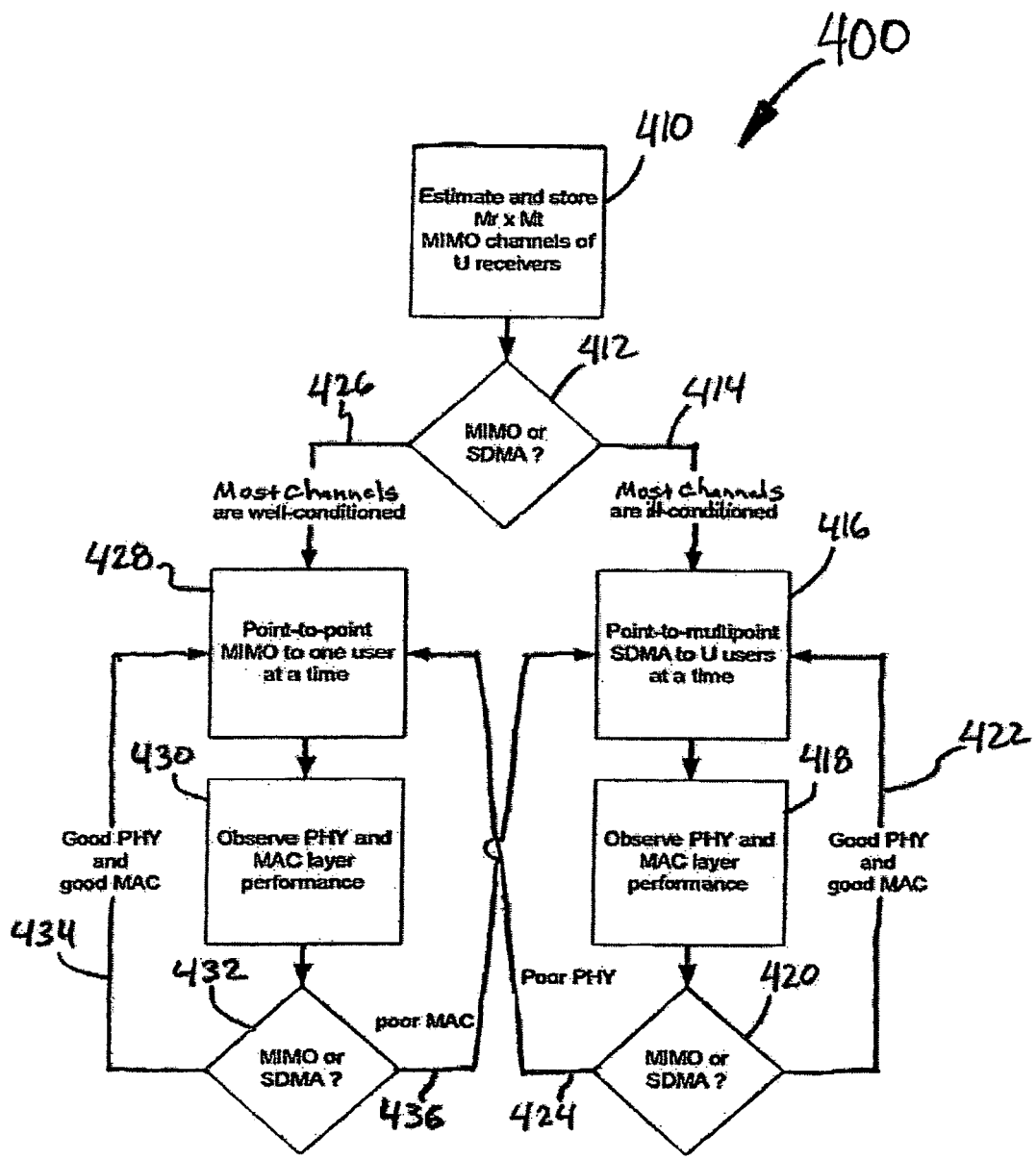
FIG. 4 is a flow diagram of a method to adaptively switch between a point-to-point link and a point-to-multipoint link in accordance with an embodiment of the present invention.

Referring now to FIG. 4, a flow diagram of a method for adaptive signaling over multiple antennas by switching between a multiple input, multiple output mode and a spatial division, multiple access mode in accordance with an embodiment of the invention will be discussed. As shown in FIG. 4, method 400 may be utilized in a wireless local area network system such as WLAN system 100 of FIG. 1 to allow WLAN system 100 to switch between a MIMO mode and an SDMA mode. In one embodiment of the invention, when method 400 switches to a MIMO mode, MIMO operation may be performed using open-loop signaling although the scope of the invention is not limited in this respect. In an alternative embodiment, either one or both MIMO and SDMA operation may be performed using closed-loop signaling, for example when the channel is stationary or nearly stationary, although the scope of the invention is not limited in this respect.

In one embodiment of the invention, method 400 may be executed by access point 122 of FIG. 1, for example as instructions executed by baseband processor 126 and stored in memory 128, although the scope of the invention is not limited in this respect. In such an embodiment, access point 122 may function as transmitting transceiver 210 of FIG. 2 while operating in a MIMO mode, and may function as transmitting transceiver 310 of FIG. 3 while operating in an SDMA mode, although the scope of the invention is not limited in this respect. At block 410, access point 122 may estimate and store the MIMO channel matrices of up to U receivers. A determination may be made at block 412 whether to operate in a MIMO mode or in an SDMA mode. In the event most of the U channels are ill-conditioned, method 400 may proceed along branch 414 to block 416 where operation may occur using point-to-multipoint SDMA to the U users concurrently.

While operating in an SDMA mode, at block 418 access point 122 may observe the performance of the PHY layer at the receivers 312 to 314, and the MAC layer at transmitting transceiver 310. A determination may be made at block 420 whether to continue in an SDMA mode or to switch to a MIMO mode, based on the performance of the PHY and MAC layers observed at block 418. In one embodiment of the invention, good performance of the PHY layer may be defined as operating at a higher data rate, at a higher signal-to-noise ratio (SNR), at a lower bit error rate (BER), and at a higher spectral efficiency, although the scope of the invention is not limited in this respect. In one embodiment of the invention, good performance of the MAC layer may be defined as operating with a lower latency and at higher throughput with relatively few retransmits, although the scope of the invention is not limited in this respect. In the event of good PHY layer and MAC layer performance, method 400 may continue along branch 422 and continue to operate in an SDMA mode at block 416, although the scope of the invention is not limited in this respect.

In the event of poor PHY performance, for example in the event of a lower spectral efficiency per user, method 400 may switch from an SDMA mode to a MIMO mode by executing along branch 424. Such a switch from an SDMA mode to a MIMO mode may occur even where the performance of the MAC layer may be considered good, although the scope of the invention is not limited in this respect. In an alternative embodiment, one or more of receivers 312 to 314 may require a higher throughput than others, for example a receiver may require a higher quality of service (QoS), which may be provided by serving fewer simultaneous users at higher spectral efficiencies per user. In such a case, method 400 may switch from an SDMA mode to a MIMO mode by executing along branch 424 to operate in a MIMO mode at block 428, although the scope of the invention is not limited in this respect.

In the event at block 412 it is determined that most of the U channels are well conditioned, then method 400 may execute in a point-to-point MIMO mode at block 428 in which transmitting transceiver 210 may communicate with one receiving transceiver 216 at a time. While operating in a MIMO mode, the PHY layer performance of the receiving transceivers 216 and the MAC layer performance of the transmitting transceiver 210 may be observed at block 430. A determination may be made at block 432 whether to continue in a MIMO mode or to switch to an SDMA mode. If the PHY layer performance and the MAC layer performance are good, then method 400 may execute along branch 434 and continue operating in a MIMO mode at block 428, although the scope of the invention is not limited in this respect.

In the event the MAC layer performance is poor, for example where there is a higher number of receiving transceivers resulting in a higher number of collisions, then method 400 may switch from a MIMO mode to an SDMA mode by executing along branch 436 to operate in an SDMA mode at block 416. Such a switch from a MIMO mode to an SDMA mode may occur even where the performance of the PHY is good, although the scope of the invention is not limited in this respect. In accordance with one embodiment of the invention, method 400 may adapt WLAN system 100 to provide a higher aggregate network throughput and a lower average latency in response to channel conditions and traffic conditions, although the scope of the invention is not limited in this respect. In one embodiment of the invention, while operating in a MIMO mode, channel conditions may occur where signal quality may be improved, but spectral efficiency may not be improved. In such a case, it may not be efficient to use all of the transmit antennas 212 to 214 for one MIMO receiving transceiver 216 at a time, and as a result it may be more efficient to serve multiple users simultaneously. In such a case, method 400 may switch from a MIMO mode to an SDMA mode by executing along branch 436 to operate in an SDMA mode at block 416, although the scope of the invention is not limited in this respect.

In accordance with one embodiment of the invention, while executing the method 400 as shown, WLAN system 100 may obtain updated channel estimates over time. Such updated channel estimates may be obtained to accommodate for changes in the physical environment, for example from movement of the users or from additional users entering or leaving the environment of WLAN system 100, that may affect the performance of the PHY layer. Such changes in the physical environment may affect the observations made at block 418 and at block 430 so that method 400 may switch between a MIMO mode and an SDMA mode in accordance with changes in the channel, although the scope of the invention is not limited in this respect.

In one embodiment of the invention, point-to-point operation in a MIMO mode and point-to-multipoint operation in an SDMA mode as embodied by method 400 may analogously extend to higher bandwidth channels as well in accordance with the present invention. For example, a point-to-point higher bandwidth channel system may serve one user at a time at a higher bandwidth, whereas a point-to-multipoint higher bandwidth channel system may serve multiple lower channel users at a time at lower bandwidths for the users. In accordance with the present invention, adaptation between point-to-point channel bonding systems and point-to-multipoint channel bonding systems may be performed in a manner substantially similar as method 400, although the scope of the invention is not limited in this respect.

Although the invention has been described with a certain degree of particularity, it should be recognized that elements thereof may be altered by persons skilled in the art without departing from the spirit and scope of the invention. It is believed that the adaptive signaling in multiple antenna systems of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A method, comprising:
   operating in a multiple input, multiple output (MIMO) mode by a transmitter device of a wireless network to communicate with a receiver device of the wireless network, the wireless network including at least one transmitter device and a plurality of receiver devices;
   observing both physical (PHY) layer performance of the receiver device and media access control (MAC) layer performance of the transmitter device during said MIMO mode of operation; and
   the transmitter device based at least on the observations switching from operating in the MIMO mode to operating in a spatial division, multiple access (SDMA) mode to communicate with the plurality of receiver devices including the receiver device, when poor MAC layer performance below a MAC layer performance threshold is observed for the transmitter device during the MIMO mode of operation of the transmitter device, even though good PHY layer performance above a PHY layer performance threshold is observed for the receiver device during the MIMO mode of operation of the transmitter device.

2. A method as claimed in claim 1, wherein said observing includes observing a latency value of said MAC layer, and said switching is based at least in part on whether the observed latency value of said MAC layer exceeds a threshold value or not.

3. A method as claimed in claim 1, wherein said observing includes observing a throughput value of said MAC layer, and said switching is based at least in part on whether the observed throughput value is below a threshold value or not.

4. A method as claimed in claim 1, wherein said observing includes observing a bit error rate of said PHY layer, and said switching occurring even though observing a bit error rate of said PHY layer that is below a threshold value indicating good PHY layer performance.

5. A method as claimed in claim 1, wherein said observing includes observing a data rate, a signal-to-noise ratio, or a spectral efficiency of said PHY layer, and said switching occurring even though observing a data rate, a signal-to-noise ratio, or a spectral efficiency of said PHY layer that is above a threshold value indicating good PHY layer performance.

6. A method, comprising:
   operating in a spatial division, multiple access (SDMA) mode by a transmitter device of a wireless network to communicate with a receiver device of a plurality of receiver devices of the wireless network, the wireless network including at least one transmitter device and the plurality of receiver devices;
   observing both physical (PHY) layer performance of the receiver device and media access control (MAC) layer performance of the transmitter device during said SDMA mode of operation; and
   the transmitter device based at least on the observations switching from operating in the SDMA mode to operating in a multiple input, multiple output (MIMO) mode to communicate with the receiver device, when poor PHY layer performance below a PHY layer performance threshold is observed for the receiver device during the SDMA mode of operation of the transmitter device, even though good MAC layer performance above a MAC layer performance threshold is observed for the transmitter device during the SDMA mode of operation of the transmitter device.

7. A method as claimed in claim 6, wherein said observing includes observing bit error rate of the PHY layer, and said switching is based at least in part on whether the observed bit error rate of the PHY layer exceeds a threshold value or not.

8. A method as claimed in claim 6, wherein said observing includes observing a data rate, a signal-to-noise ratio, or a spectral efficiency of said PHY layer, and said switching is based at least in part on whether the observed data rate, signal-to-noise ratio, or spectral efficiency is below a threshold value or not.

9. A method as claimed in claim 6, wherein said observing includes observing a latency value of said MAC layer, and said switching occurring even though observing a latency value of said MAC layer that is below a threshold value indicating good MAC layer performance.

10. A method as claimed in claim 6, wherein said observing includes observing a throughput value of said MAC layer, and said switching occurring even though observing a throughput value of said MAC layer that exceeds a threshold value indicating good MAC layer performance.

11. An article, comprising:
    a storage medium having stored thereon instructions that, when executed by a computing platform, result in adaptive switching between a multiple input, multiple output (MIMO) mode and a spatial division, multiple access (SDMA) mode by:
    operating in a MIMO mode to communicate with a receiver device of a wireless network, the computing platform being a transmitter device of the wireless network, the wireless network including at least one transmitter device and a plurality of receiver devices;
    observing both physical (PHY) layer performance of the receiver device and media access control (MAC) layer performance of the transmitter device during the MIMO mode of operation; and
    switching, based at least on the observations, from operating in the MIMO mode to operating in a SDMA mode to communicate with the plurality of receiver devices including the receiver device, when poor MAC layer performance below a MAC layer performance threshold is observed for the transmitter device during the MIMO mode of operation of the transmitter device, even though good PHY layer performance above a PHY layer performance threshold is observed for the receiver device during the MIMO mode of operation of the transmitter device.

12. An article as claimed in claim 11, wherein said observing includes observing a latency value of said MAC layer, and said switching is based at least in part on whether the observed latency value of said MAC layer exceeds a threshold value or not.

13. An article as claimed in claim 11, wherein said observing includes observing a throughput value of said MAC layer, and said switching is based at least in part on whether the observed throughput value is below a threshold value or not.

14. An article as claimed in claim 11, wherein said observing includes observing a bit error rate of said PHY layer, and said switching occurring even though observing a bit error rate of said PHY layer that is below a threshold value indicating good PHY layer performance.

15. An article as claimed in claim 11, said observing includes observing a data rate, a signal-to-noise ratio, or a spectral efficiency of said PHY layer, and said switching occurring even though observing a data rate, a signal-to-noise ratio, or a spectral efficiency of said PHY layer that is above a threshold value indicating good PHY layer performance.

16. An article, comprising:
a storage medium having stored thereon instructions that, when executed by a computing platform, result in adaptive switching between a multiple input, multiple output (MIMO) mode and a spatial division, multiple access (SDMA) mode by:
operating in a SDMA mode to communicate with a receiver device of a plurality of receiver devices of a wireless network, the computing platform being a transmitter device of the wireless network, the wireless network including at least one transmitter device and the plurality of receiver devices;
observing both physical (PHY) layer performance of the receiver device and media access control (MAC) layer performance of the transmitter device during said SDMA mode of operation; and
switching, based at least on the observations, from operating in the SDMA mode to operating in a multiple input, multiple output (MIMO) mode to communicate with the receiver device, when poor PHY layer performance below a PHY layer performance threshold is observed for the receiver device during the SDMA mode of operation of the transmitter device, even though good MAC layer performance above a MAC layer performance threshold is observed for the transmitter device during the SDMA mode of operation of the transmitter device.

17. An article as claimed in claim 16, wherein said observing includes observing bit error rate of the PHY layer, and said switching is based at least in part on whether the observed bit error rate of the PHY layer exceeds a threshold value or not.

18. An article as claimed in claim 16, wherein said observing includes observing a data rate, a signal-to-noise ratio, or a spectral efficiency of said PHY layer, and said switching is based at least in part on whether the observed data rate, signal-to-noise ratio or spectral efficiency is below a threshold value or not.

19. An article as claimed in claim 16, wherein said observing includes observing a latency value of said MAC layer, and said switching occurring even though observing a latency value of said MAC value that is below a threshold value indicating good MAC layer performance.

20. An article as claimed in claim 16, wherein said observing includes observing a throughput value of said MAC layer, and said switching occurring even though observing a throughput value of said MAC layer that exceeds a threshold value indicating good MAC layer performance.

21. An apparatus, comprising:
a transceiver to receive signals from a receiver device of a wireless network, the wireless network including at least a transmitter device and a plurality of receiver devices, the apparatus being a transmitter device of the wireless network and the receiver device being one of the plurality of receiver devices of the wireless network;
at least two or more omnidirectional antennas to couple to said transceiver; and
a baseband processor to couple to said transceiver, wherein said baseband processor and said transceiver to observe both physical (PHY) layer performance of the receiver device and media access control (MAC) layer performance of the apparatus, to switch from a multiple input, multiple output (MIMO) mode to a spatial division, multiple access (SDMA) mode under a first condition, and to switch from a SDMA mode to a MIMO mode under a second condition, the first condition includes observing poor MAC layer performance for the transmitter device below a MAC layer performance threshold when the transmitter device is operating in MIMO mode and even though good PHY layer performance above a PHY layer performance threshold is observed for the receiver device during the MIMO mode of operation of the transmitter, and the second condition includes observing poor PHY layer performance for the receiver device below a PHY layer performance threshold when the transmitter device is operating in SDMA mode and even though good MAC layer performance above a MAC layer performance threshold is observed for the transmitter device during the SDMA mode of operation of the transmitter.

22. An apparatus as claimed in claim 21, wherein the first condition includes observing a latency value of said MAC layer, and said switching from the MIMO mode to the SDMA mode is based at least in part on whether the observed latency value of said MAC layer exceeds a threshold value or not.

23. An apparatus as claimed in claim 21, wherein the second condition includes observing a data rate, a signal-to-noise ratio or a spectral efficiency of said PHY layer, and said switching from the SDMA mode to the MIMO mode is based at least in part on whether the observed data rate, signal-to-noise ratio or spectral efficiency is below a threshold value or not.

* * * * *